US006833391B1

(12) United States Patent
Chisholm et al.

(10) Patent No.: US 6,833,391 B1
(45) Date of Patent: Dec. 21, 2004

(54) CURABLE (METH)ACRYLATE COMPOSITIONS

(75) Inventors: Bret Ja Chisholm, Clifton Park, NY (US); Anne Herrmann, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/249,998

(22) Filed: May 27, 2003

(51) Int. Cl.[7] .................................................. C08F 2/46
(52) U.S. Cl. ........................... 522/28; 522/26; 522/64; 522/182; 526/328; 526/329.7; 526/293.2; 428/64.1
(58) Field of Search ............................. 522/64, 26, 28, 522/182, 328; 526/328, 329.7, 293.2, 292.3; 428/64.1

(56) References Cited

U.S. PATENT DOCUMENTS

| | | |
|---|---|---|
| 4,059,618 A | 11/1977 | Blumenfeld et al. |
| 4,198,465 A | 4/1980 | Moore et al. |
| 4,420,527 A | 12/1983 | Conley |
| 4,576,850 A | 3/1986 | Martens |
| 4,578,445 A | 3/1986 | Sakagami et al. |
| 4,582,885 A | 4/1986 | Barber |
| 4,668,558 A | 5/1987 | Barber |
| 4,721,377 A | 1/1988 | Fukuda et al. |
| 4,812,032 A | 3/1989 | Fukuda et al. |
| 5,175,030 A | 12/1992 | Lu et al. |
| 5,183,597 A | 2/1993 | Lu |
| 5,239,026 A | 8/1993 | Babirad et al. |
| 5,424,339 A | 6/1995 | Zanka et al. |
| 5,450,235 A | 9/1995 | Smith et al. |
| 5,470,892 A | 11/1995 | Gupta et al. |
| 5,479,555 A | 12/1995 | Rot et al. |
| 5,518,789 A | 5/1996 | Burns et al. |
| 5,626,800 A | 5/1997 | Williams et al. |
| 5,635,278 A | 6/1997 | Williams |
| 5,691,846 A | 11/1997 | Benson, Jr. et al. |
| 5,714,218 A | 2/1998 | Nishio et al. |
| 5,716,681 A | 2/1998 | Williams |
| 5,855,983 A | 1/1999 | Williams |
| 5,883,607 A | 3/1999 | Williams |
| 5,891,931 A | 4/1999 | Leboeuf et al. |
| 5,900,287 A | 5/1999 | Williams |
| 5,908,874 A | 6/1999 | Fong et al. |
| 5,932,626 A | 8/1999 | Fong et al. |
| 5,969,867 A | 10/1999 | Fukushima et al. |
| 5,981,113 A | 11/1999 | Christian |
| 5,988,820 A | 11/1999 | Huang et al. |
| 6,005,137 A | 12/1999 | Moore et al. |
| 6,107,364 A | 8/2000 | Fong et al. |
| 6,114,010 A | 9/2000 | Williams |
| 6,206,550 B1 | 3/2001 | Fukushima et al. |
| 6,218,074 B1 | 4/2001 | Dueber et al. |
| 6,228,500 B1 | 5/2001 | Hiroshige et al. |
| 6,232,359 B1 | 5/2001 | Christian |
| 6,280,063 B1 | 8/2001 | Fong et al. |
| 6,313,187 B2 | 11/2001 | LeBoeuf et al. |
| 6,313,245 B1 | 11/2001 | Moore et al. |
| 6,329,485 B1 | 12/2001 | Vanderbilt |
| 6,350,035 B1 | 2/2002 | Smith et al. |
| 6,355,754 B1 | 3/2002 | Olson et al. |
| 6,368,682 B1 | 4/2002 | Fong |
| 6,428,889 B1 | 8/2002 | Nagaoka |
| 6,503,564 B1 | 1/2003 | Fleming et al. |
| 2001/0025086 A1 | 9/2001 | LeBoeuf et al. |
| 2002/0123589 A1 | 9/2002 | Olson et al. |
| 2002/0126382 A1 | 9/2002 | Smith et al. |
| 2002/0132928 A1 | 9/2002 | Soane et al. |
| 2002/0192459 A1 | 12/2002 | Bacon, Jr. |

FOREIGN PATENT DOCUMENTS

| | | |
|---|---|---|
| EP | 0 759 448 | 8/1995 |
| JP | 359136310 | * 9/1994 |
| WO | WO 98/50805 | 11/1998 |
| WO | WO 01/30933 | 5/2001 |

OTHER PUBLICATIONS

JP4285654. Publication Date Oct. 9, 1992. Abstract Only (1 page).
JP5287040. Publication Date Nov. 2, 1993. Abstract Only (1 page).
JP3153715. Publication Date Jul. 1, 1991. Abstract Only (1 page).
JP2000009901. Publication Date Jan. 14, 2000. Abstract Only (1 page).
Beecroft, et al. High Refractive Index Polymers for Optical Applications. J.M.S. Pure Appl. Chem. A34(4), pp. 573–586. (1997).
Zwiers, et al. Replication of High Precision Aspherical Lenses Using UV–Curable Coatings Conference Location : LImburg Neth. conference Date Apr. 14, 1985. Source: Publ by Elsevier Applied Science Publ, London, Engl and New York, NY USA pp. 673–677.
JP3153715. Publication Date Jul. 1, 1991. Abstract Only (1 page).
JP2000009901. Publication Date Jan. 14, 2000. Abstract Only (1 page).
Beecroft, et al. High Refractive Index Polymers for Optical Applications. J.M.S. Pure Appl. Chem. A34(4), pp. 573–586. (1997).
Zwiers, et al. Replication of High Precision Aspherical Lenses Using UV–Curable Coatings Conference Location : LImburg Neth. conference Date Apr. 14, 1985. Source: Publ by Elsevier Applied Science Publ, London, Engl and New York, NY USA pp. 673–677.
U.S. patent application Ser. No. 10/336,493, filed Dec. 31, 2002.

* cited by examiner

*Primary Examiner*—Tatyana Zalukaeva
(74) *Attorney, Agent, or Firm*—Cantor Colburn LLP

(57) ABSTRACT

A curable composition includes a multifunctional (meth) acrylate; a substituted or unsubstituted arylether (meth) acrylate monomer; a brominated aromatic (meth)acrylate monomer; and a polymerization intiator. The compositions exhibit high refractive indices and, upon polymerization, the compositons provide films having excellent thermomechanical properties.

18 Claims, No Drawings

CURABLE (METH)ACRYLATE COMPOSITIONS

BACKGROUND OF INVENTION

Disclosed herein are curable (meth)acrylate compositions and, more specifically ultraviolet (UV) radiation curable (meth)acrylate compositions. The compositions are suitable for optical articles and particularly for light management films.

In backlight computer displays or other display systems, optical films are commonly used to direct light. For example, in backlight displays, light management films use prismatic structures (often referred to as microstructure) to direct light along a viewing axis (i.e., an axis substantially normal to the display). Directing the light enhances the brightness of the display viewed by a user and allows the system to consume less power in creating a desired level of on-axis illumination. Films for turning or directing light can also be used in a wide range of other optical designs, such as for projection displays, traffic signals, and illuminated signs.

Compositions used to form light management films to direct light desirably have the ability to replicate the microstructure needed to provide the light directing capability upon cure. It is furthermore desirable for the glass transition temperature (Tg) of the cured composition to be high enough for shape retention during storage and use. It is also desirable for light management films made from the cured composition to exhibit high brightness. Finally, the composition used to make light management film advantageously provides a cured composition having a high refractive index (RI). While a variety of materials are presently available for use in light management films, there remains a continuing need for still further improvement in the materials used to make them, particularly materials that upon curing possess the combined attributes desired to satisfy the increasingly exacting requirements for light management film applications.

SUMMARY OF INVENTION

The above-described needs are alleviated by a curable composition comprising a multifunctional (meth)acrylate; a substituted or unsubstituted arylether (meth)acrylate monomer; a brominated aromatic (meth)acrylate monomer; and a polymerization initiator.

Other embodiments, including a method of preparing a curable composition, a cured composition comprising the reaction product of the curable composition, and articles comprising the cured composition, are described below.

DETAILED DESCRIPTION

It has been unexpectedly discovered that the addition of a brominated aromatic (meth)acrylate monomer to a multifunctional (meth)acrylate and a substituted or unsubstituted arylether (meth)acrylate monomer in the presence of a polymerization initiator provides a composition having improved RI. Furthermore, upon curing the cured composition exhibits improved Tg. Finally, a cured, microstructured film made from the curable composition exhibits improved brightness compared to cured, microstructured film made from curable compositions lacking the brominated aromatic (meth)acrylate monomer. As used herein, "(meth)acrylate" is inclusive of both acrylate and methacrylate functionality, in addition to thioester (meth)acrylate functionality.

In one aspect, the curable composition is a solventless, high refractive index, radiation curable composition that provides a cured material having an excellent balance of properties. The compositions are ideally suited for light management film applications. In one aspect, light management films prepared from the curable compositions exhibit good brightness.

The curable compositions comprise a multifunctional (meth)acrylate, i.e., a molecule containing at least two (meth)acrylate functional groups. In a preferred embodiment, the multifunctional (meth)acrylate is represented by the formula (I)

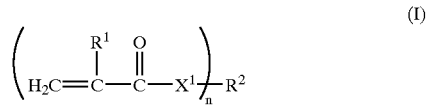

wherein $R^1$ is hydrogen or methyl; $X^1$ is O or S; $R^2$ is substituted or unsubstituted C—C alkyl, aryl, alkaryl, arylalkyl, or heteroaryl; and n is 2, 3, or 4. The substitution on $R^2$ includes, but is not limited to, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents. Preferred $R_2$ groups include such groups as alkylene and hydroxy alkylene disubstituted bisphenol-A or bisphenol-F ethers, especially the brominated forms of bisphenol-A and -F. Suitable $R^2$ groups include those according to the formula (II)

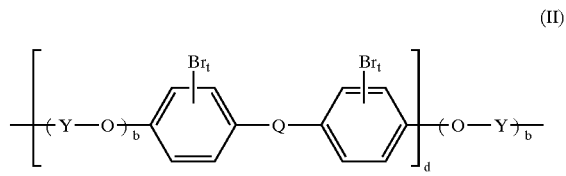

wherein Q is —$C(CH_3)_2$,— — $CH_2$, —C(O)—, —S(O)—, or —$S(O)_2$—; Y is $C_1$–$C_6$ alkyl or hydroxy substituted $C_1$–$C_6$ alkyl b is 1 to 10; t is 0, 1, 2, 3, or 4; and d is about 1 to about 3.

The multifunctional (meth)acrylates may include compounds produced by the reaction of an acrylic or methacrylic acid with a di-epoxide, such as bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-dibromo-4-oxiranylmethoxy-phenyl)-1-methyl-ethyl]-phenoxy}-propan-2-ol; and the like; and a combination comprising at least one of the foregoing di-epoxides. Examples of such compounds include 2,2-bis(4-(2-(meth)acryloxyethoxy)phenyl)propane; 2,2-bis((4-(meth)acryloxy)phenyl)propane; acrylic acid 3-(4-{1-[4-(3-acryloyloxy-2-hydroxy-propoxy)-3,5,-dibromo-phenyl]-1-methyl-ethyl}-2,6-dibromo-phenoxy)-2-hydroxy-propyl ester; acrylic acid 3-[4-(1-{4-[3-(4-{1-[4-(3-acryloyloxy-2-hydroxy-propoxy)-3,5-dibromo-phenyl]-1-methyl-ethyl}-2,6-dibromo-phenoxy)-2-hydroxy-propoxy]-3,5dibromo-phenyl}-1-methyl-ethyl)-2,6-dibromo-phenoxy]-2-hydroxy-propyl ester; and the like, and a combination comprising at least one of the foregoing multifunctional (meth) acrylates. A suitable multifunctional (meth)acrylate based on the reaction product of tetrabrominated bisphenol-A di-epoxide is RDX 51027 available from UCB Chemicals.

The multifunctional (meth)acrylate is present in the curable composition in an amount of about 25 to about 75 weight percent based on the total composition. Within this range, an amount of greater than or equal to about 35 weight percent may be used, with greater than or equal to about 45 weight percent preferred, and greater than or equal to about 50 weight percent more preferred. Also within this range, an amount of less than or equal to about 70 weight percent may be used, with less than or equal to about 65 weight percent preferred, and less than or equal to about 60 weight percent more preferred.

The curable composition further comprises a substituted or unsubstituted arylether (meth)acrylate monomer. A preferred substituted or unsubstituted arylether (meth)acrylate monomer is represented by the formula (III)

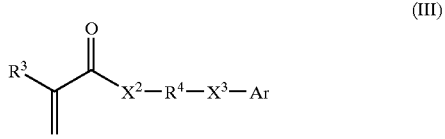

(III)

wherein $R^3$ is hydrogen or methyl; $X^2$ is O or S; $X^3$ is O or S; $R^4$ is, substituted or unsubstituted $C_1$–$C_6$ alkyl or alkenyl; Ar is substituted or unsubstituted $C_6$–$C_{12}$ aryl, including phenyl wherein, the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents. The Ar group, when substituted, may be mono-, di-, tri-, tetra- or penta-substituted. As used herein, "arylether" is inclusive of both ethers and thioethers. Particularly preferred substituted or unsubstituted arylether (meth)acrylate monomers include 2-phenoxyethyl (meth) acrylate and 2-phenylthioethyl (meth)acrylate.

The substituted or unsubstituted arylether (meth)acrylate monomer is present in the curable composition in an amount of about 15 to about 70 weight percent based on the total composition. Within this range, it may be preferred to use an amount of greater than or equal to about 20 weight percent, more preferably greater than or equal to about 30 weight percent. Also within this range, it may be preferred to use an amount of less than or equal to about 60 weight percent, more preferably less than or equal to about 50 weight percent, yet more preferably less than or equal to about 40 weight percent.

In one aspect, the composition may comprise two or more substituted or unsubstituted arylether (meth)acrylate monomers of different chemical compounds. In one embodiment, a first substituted or unsubstituted arylether (meth)acrylate monomer comprises the formula (III) above wherein X is S and a second substituted or unsubstituted arylether (meth) acrylate monomer comprising the formula (II) wherein $X^3$ is O.

The brominated aromatic (meth)acrylate monomer may be present in the curable composition to impart increased refractive index of the curable composition or increased thermomechanical properties (i.e., increased Tg) of the composition upon curing. Useful brominated aromatic (meth)acrylate monomers may be represented by the formula (IV)

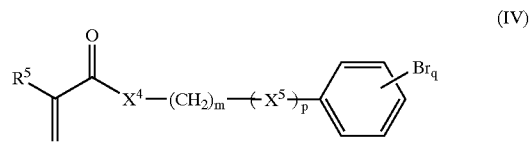

(IV)

wherein $R^5$ is hydrogen or methyl; $X^4$ is O or S; $X^5$ is O or S; m is 0, 1, 2, or 3; p is 0 or 1; and q is 1, 2, 3, 4, or 5. Highly preferred brominated aromatic (meth) acrylate monomers include 2,4,6-tribromobenzyl (meth)acrylate, tetrabromobenzyl (meth)acrylate, tribromophenyl (meth)acrylate, and pentabromobenzyl (meth)acrylate.

The brominated aromatic (meth)acrylate monomer is present in the curable composition in an amount of about 1 to about 20 weight percent based on the total composition. Within this range, an amount of greater than or equal to about 3 weight percent may be used, with an amount of greater than or equal to about 4 preferred, and an amount of greater than or equal to about 5 weight percent more preferred. Also within this range, it may be preferred to use an amount of less than or equal to about 15 weight percent, more preferably less than or equal to about 10 weight percent, yet more preferably less than or equal to about 8 weight percent.

The composition further comprises a polymerization initiator to promote polymerization of the (meth)acrylate components. Suitable polymerization initiators include photoinitiators that promote polymerization of the components upon exposure to ultraviolet radiation. Particularly suitable photoinitiators include phosphine oxide photoinitiators. Examples of such photoinitiators include the IRGACURE® and DAROCUR™ series of phosphine oxide photoinitiators available from Ciba Specialty Chemicals; the LUCIRIN® series from BASF Corp.; and the ESACURE® series of photoinitiators. Other useful photoinitiators include ketone-based photoinitiators, such as hydroxy- and alkoxyalkyl phenyl ketones, and thioalkylphenyl morpholinoalkyl ketones. Also suitable are benzoin ether photoinitiators.

The polymerization initiator may include peroxy-based initiators that may promote polymerization under thermal activation. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha, alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di (trimethylsilyl) peroxide, trimethylsilylphenyltriphenylsilyl peroxide, and the like, and combinations comprising at least one of the foregoing polymerization initiators.

In a preferred embodiment, the polymerization initiator comprises a phosphine oxide photoinitiator.

The polymerization initiator may be used in an amount of about 0.01 to about 10 weight percent based on the total weight of the composition. Within this range, it may be preferred to use a polymerization initiator amount of greater than or equal to about 0.1 weight percent, more preferably greater than or equal to about 0.5 weight percent. Also within this range, it may be preferred to use a polymerization initiator amount of less than or equal to about 5 weight percent, more preferably less than or equal to about 3 weight percent.

The composition may, optionally, further comprise an additive selected from flame retardants, antioxidants, thermal stabilizers, ultraviolet stabilizers, dyes, colorants, antistatic agents, and the like, and a combination comprising at least one of the foregoing additives, so long as they do not deleteriously affect the polymerization of the composition. Selection of particular additives and their amounts may be performed by those skilled in the art.

In another embodiment a curable composition consists of a multifunctional (meth)acrylate according to the formula

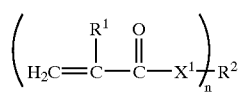

wherein $R^1$ is H or methyl; $X_1$ is O or S; $R^2$ is substituted or unsubstituted $C_1$–$C_{300}$ alkyl aryl, alkaryl, arylalkyl; or heteroaryl; and n is 2, 3, or 4; a substituted or unsubstituted arylether (meth)acrylate monomer according to the formula

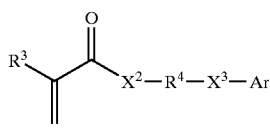

wherein $R^3$ is hydrogen or methyl; $X^2$ is O or S; $X^3$ is S; $R^4$ is substituted or unsubstituted $C_1$–$C_6$ alkyl or alkenyl; Ar is substituted or unsubstituted $C_6$–$C_{12}$ aryl including phenyl; wherein the substitution on the $R^4$ and Ar is, independently, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; and a polymerization initiator.

In one aspect, the curable composition has a RI greater than or equal to about 1.54, with greater than or equal to about 1.56 preferred, greater than or equal to about 1.58 more preferred, and greater than or equal to about 1.59 most preferred.

In an additional aspect, the cured composition may have a RI greater than or equal to about 1.54, with greater than or equal to about 1.56 preferred, greater than or equal to about 1.58 more preferred, and greater than or equal to about 1.59 most preferred.

In yet another aspect, the cured composition has a Tg of greater than or equal to about 40° C., with greater than or equal to about 60° C. preferred, greater than or equal to about 80° C. more preferred, and greater than or equal to about 90° C. most preferred.

In another aspect, light management films made from the cured composition exhibits a brightness of greater than or equal to about 1400 candela per meter squared (cd/m$^2$), with greater than or equal to about 1450 cd/m$^2$ preferred, and greater than or equal to about 1490 cd/m$^2$ more preferred.

The curable composition may be prepared by simply blending the components thereof, with efficient mixing to produce a homogeneous mixture. When forming articles from the curable composition, it is often preferred to remove air bubbles by application of vacuum or the like, with gentle heating if the mixture is viscous, and casting or otherwise creating a film of the composition on a desired surface. The composition can then be charged to a mold that may bear a microstructure to be replicated and polymerized by exposure to ultraviolet radiation or heat to produce a cured article.

An alternative method includes applying the radiation curable, uncured, composition to a surface of a base film substrate, passing the base film substrate having the uncured composition coating through a compression nip defined by a nip roll and a casting drum having a negative pattern master of the microstructures. The compression nip applies a sufficient pressure to the uncured composition and the base film substrate to control the thickness of the composition coating and to press the composition into full dual contact with both the base film substrate and the casting drum to exclude any air between the composition and the drum. The radiation curable composition is cured by directing radiation energy through the base film substrate from the surface opposite the surface having the composition coating while the composition is in full contact with the drum to cause the microstructured pattern to be replicated in the cured composition layer.

The curable compositions are preferably cured by UV radiation. The wavelength of the UV radiation may be from about 1800 angstroms to about 4000 angstroms. The lamp systems used to generate such radiation include ultraviolet lamps and discharge lamps, as for example, xenon, metallic halide, metallic arc, low or high pressure mercury vapor discharge lamp, etc. Curing is meant both polymerization and cross-linking to form a non-tacky material.

When heat curing is used, the temperature selected may be about 80° to about 130° C. Within this range, a temperature of greater than or equal to about 90° C. may be preferred. Also within this range, a temperature of greater than or equal to about 100° C. may be preferred. The heating period may be of about 30 seconds to about 24 hours. Within this range, it may be preferred to use a heating time of greater than or equal to about 1 minute, more preferably greater than or equal to about 2 minutes. Also within this range, it may be preferred to use a heating time of less than or equal to about 10 hours, more preferably less than or equal to about 5 hours, yet more preferably less than or equal to about 3 hours. Such curing may be staged to produce a partially cured and often tack-free composition, which then is fully cured by heating for longer periods or temperatures within the aforementioned ranges.

In one embodiment, the composition may be both heat cured and UV cured.

In one embodiment, a curable composition comprises about 35 to about 65 weight percent of a multifunctional (meth)acrylate; about 30 to about 45 weight percent of a substituted or unsubstituted arylether (meth)acrylate monomer; about 1 to about 10 weight percent of a brominated aromatic (meth)acrylate monomer; and about 0.1 to about 5 weight percent of a phosphine oxide photoinitiator.

In another embodiment, the curable composition comprises the reaction product of (meth)acrylic acid with a di-epoxide that is bisphenol-A diglycidyl ether, bisphenol-F diglycidyl ether, tetrabromo bisphenol-A diglycidyl ether, tetrabromo bisphenol-F diglycidyl ether, 1,3-bis-{4-[1-methyl-1-(4-oxiranylmethoxy-phenyl)-ethyl]-phenoxy}- propan-2-ol, 1,3-bis-{2,6-dibromo-4-[1-(3,5-dibromo-4-oxiranylmethoxy-phenyl)-1-methyl-ethyl]-phenoxy}-propan-2-ol, or a combination comprising at least one of the forgoing di-epoxides; phenylthioethyl (meth)acrylate, phenoxyethyl (meth)acrylate, or a combination comprising at least one of the foregoing substituted or unsubstituted arylether (meth)acrylate monomer; pentabromobenzyl (meth)acrylate; and a phosphine oxide photoinitiator.

In yet another embodiment, a method of making the composition comprises blending a multifunctional (meth)acrylate, a substituted or unsubstituted arylether (meth)acrylate monomer, a brominated aromatic (meth)acrylate monomer, and a polymerization initiator.

Other embodiments include the reaction product obtained by curing any of the above curable compositions.

Still other embodiments include articles made from any of the cured compositions. Articles that may be fabricated from the compositions include, for example, optical articles, such as light management films for use in back-light displays; projection displays; traffic signals; illuminated signs; optical lenses; Fresnel lenses; optical disks; diffuser films; holographic substrates; or as substrates in combination with conventional lenses, prisms or mirrors.

All cited patents, patent applications, and other references are incorporated herein by reference in their entirety. The invention is further illustrated by the following non-limiting examples.

EXAMPLES

The formulations for the following Examples were prepared from the components listed in Table 1.

TABLE 1

| Component | Trade Name | Description | Source |
|---|---|---|---|
| RDX51027 | RDX51027 | Diacrylate of tetrabromo bisphenol-A di-epoxide | UCB Chemicals |
| PTEA | BX-PTEA | Phenylthioethyl acrylate | Bimax Company |
| PEA | SR339 | 2-Phenoxyethyl acrylate | Sartomer |
| PBrBA | FR1025M | Pentabromobenzyl acrylate | Ameribrom |
| Irgacure | Irgacure 819 | Bis(2,4,6-trimethylbenzoyl)-phenylphosphine oxide | Ciba-Geigy |

Examples of cured flat films and cured microstructured films coated on a substrate were prepared according to the following procedures. As used in the Examples, coated films means a two-layered film of the composition and film substrate. Coated cured flat films having a 7 to 10 micrometer thick cured composition layer atop a 0.005-inch (0.127 centimeter) thick polycarbonate film substrate were prepared using a custom-made laminating unit and Fusion EPIC 6000UV curing system. The laminating unit consists of two rubber rolls: a bottom variable speed drive roll and a pneumatically driven top nip roll. This system is used to press together laminate stacks that are passed between the rolls. The laminate stacks contain a tool with or without a desired geometry to replicate lying face up, a curable composition coated on the tool, and a film substrate on the top of the curable composition. The coated flat films were prepared by transferring approximately 0.5 mL of curable composition to a highly polished, flat, chrome-plated 5 by 7-inch (12.7 by 17.8 centimeter) steel plate tool in a continuous line at the front, or leading edge of the plate. A piece of film substrate was then placed over the curable composition and the resulting stack sent through the laminating unit to press and distribute the curable composition uniformly between the tool and film substrate. With higher viscosity formulations, higher pressure and lower -speeds were used and the tool was heated to obtain the desired thickness. Photopolymerization of the curable composition within the stack was accomplished by passing the stack twice under a 600-watt V-bulb at a speed of 16 feet/minute (0.081 meters/second), using high power and a focal length of 2.1 inches (5.3 centimeter), curing through the film substrate top layer. The coated cured flat film was then peeled off of the flat tool and used for abrasion, % haze, % transmission, color, yellowness index, and adhesion measurements.

Coated cured microstructured films for measuring luminance were made in the same manner as coated cured flat films by substituting the highly polished flat steel plate for an electroformed tool with a prismatic geometry. The geometry of the prisms can be found in FIG. 6 of the copending U.S. application Ser. No. 10/065,981 entitled "Brightness Enhancement Film With Improved View Angle"filed Dec. 6, 2002, which is incorporated herein in its entirety.

Glass transition temperatures (Tg) of the cured compositions were measured by dynamic mechanical analysis (DMA) using a Rheometrics Solids Analyzer RSA II operating in tension with a frequency of 1.0 rad/s, strain of 0.01%, and temperature ramp of 2° C./minute. Cured free films (no film substrate) for DMA were prepared by placing approximately one gram of a curable composition into an aluminum pan having a 2 inch (5.08 centimeter) diameter, spreading the curable composition across the bottom of the pan by tilting it, and photopolymerizing the composition under a nitrogen atmosphere. If the curable composition was viscose, the pan and curable composition were mildly heated to reduce the viscosity and enhance the flowability. Photopolymerization was accomplished using a Fusion EPIC 6000UV processor equipped with a 600 watt V-bulb. The distance of the lamp from the conveyor belt was 2.1 inches (5.3 centimeter). The belt speed used was 16 feet/minute (0.081 meters/second) and the sample was passed under the lamp three times.

The refractive index (RI) of the liquid curable compositions was measured using a Bausch and Lomb Abbe-3L refractometer; the wavelength associated with the measurement was 589.3 nanometers.

The percent (%) haze and % transmission of light through the coated cured flat films were determined according to ASTM D1003 using a BYK-Gardner Haze-guard Plus Hazemeter.

Oscillating Sand Abrasion Test (OST % haze) was performed on the coated cured flat films using a modification to the procedure described in ASTM F735. The major modification consisted of a change in the mode of sand oscillation from linear oscillation to circular oscillation. The apparatus used for the abrasion process was a vortex shaker manufactured by Glas-Col Company equipped with a metal tray to hold the sample and sand. The sand was silica sand from Fairmount Minerals of Wedron, Ill.(C.A.S. 14808-60-7).

One thousand milliliters of sand and an oscillation time of 10 minutes were used for the test.

The brightness of the coated cured microstructured films was determined using the Display Analysis system Microvision SS220. Microvision SS220, a computer based measurement system, uses a goniometric assembly and a mechanical positioner for the collection of in-axis and off-axis data at various locations of the films. The brightness measurements are achieved by utilizing a diffraction grating spectrometer with a collimation optical probe. The microstructured or light management film is mounted onLG-Phillips backlight module, which is composed of a bottom diffuser D177 and crossed light management films. A 13 point test and hemi test are conducted to provide the uniformity of the brightness over 13 specific locations on the film and the range of viewing angle at the center location of the film. The brightness is provided in units of candela per meter squared ($cd/m^2$).

The adhesion was measured for the coated cured flat film according to ASTM D3359.

The viscosity for each curable composition included in the following examples was measured using a Brookfield LVDV-II Cone/Plate Viscometer at 25° C., with a CPE40 or CPE51 spindle attachment, 0.5 mL liquid curable composition sample volume while maintaining a torque range within 15% to 90% of the equipment maximum for the specific cone attachment. The viscosity measurements are provided in centipoise (cP).

The color of the coated cured flat films was determined by measuring L*, a*, and b* using a Gretag Macbeth Color-Eye 7000A colorimeter using L*, a*, b* color space, the D65 illuminant, and a 10 degree observer inclusive of a specular reflection.

The yellowness index (YI) of the coated cured flat films was measured using a Gretag Macbeth Color-Eye 7000A calorimeter.

Table 2 provides glass transition temperature data for free films made from PTEA and RDX51027 (Examples 1–4) and free films made from PTEA, RDX51027, and PBrBA (Examples 5–8). The results illustrate the dramatic increase in Tg of the resulting cured compositions made from formulations containing PBrBA. In the following tables, all of the amounts are shown in weight percent based on the total weight of the composition, with the actu amount of each component of the formulation enclosed in parenthesis (in grams).

TABLE 2

| | Components in Weight percent (grams) | | | | |
|---|---|---|---|---|---|
| Example | RDX51027 | PTEA | PBrBA | Irgacure | Tg (° C.) |
| 1 | 69.5 (7) | 30 (3) | — | 0.5 (0.05) | 90 |
| 2 | 59.5 (6) | 40 (4) | — | 0.5 (0.05) | 63 |
| 3 | 49.5 (5) | 50 (5) | — | 0.5 (0.05) | 47 |
| 4 | 39.5 (4) | 60 (6) | — | 0.5 (0.05) | 28 |
| 5 | 69.5 (7) | 21 (2.1) | 9 (0.9) | 0.5 (0.05) | 99 |
| 6 | 59.5 (6) | 28 (2.8) | 12 (1.2) | 0.5 (0.05) | 86 |
| 7 | 49.5 (5) | 35 (3.5) | 15 (1.5) | 0.5 (0.05) | 71 |
| 8 | 39.5 (4) | 42 (4.2) | 18 (1.8) | 0.5 (0.05) | 54 |

Table 3 provides glass transition data for free films made from PEA and RDX51027 (Examples 9, 13, 17, and 21) and free films made from PEA, RDX51027, and PBrBA (Examples 10–12, 14–16, 18–20, and 22–24). The results illustrate the dramatic increase in Tg of the resulting cured compositions containing PBrBA. Again, the amounts are shown in weight percent with the actual amount of each component of the formulation end in parenthesis (in grams).

TABLE 3

| | Components in Weight percent (grams) | | | | |
|---|---|---|---|---|---|
| Example | RDX51027 | PEA | PBrBA | Irgacure | Tg (° C.) |
| 9 | 69.5 (7) | 30 (3) | — | 0.5 (0.05) | 93 |
| 10 | 69.5 (7) | 27 (2.7) | 3 (0.3) | 0.5 (0.05) | 101 |
| 11 | 69.5 (7) | 24 (2.4) | 6 (0.6) | 0.5 (0.05) | 106 |
| 12 | 69.5 (7) | 21 (2.1) | 9 (0.9) | 0.5 (0.05) | 112 |
| 13 | 59.5 (6) | 40 (4) | — | 0.5 (0.05) | 74 |
| 14 | 59.5 (6) | 36 (3.6) | 4 (0.4) | 0.5 (0.05) | 79 |
| 15 | 59.5 (6) | 32 (3.2) | 8 (0.8) | 0.5 (0.05) | 91 |
| 16 | 59.5 (6) | 25 (2.8) | 12 (1.2) | 0.5 (0.05) | 96 |
| 17 | 49.5 (5) | 50 (5) | — | 0.5 (0.05) | 57 |
| 18 | 49.5 (5) | 45 (4.5) | 5 (0.5) | 0.5 (0.05) | 65 |
| 19 | 49.5 (5) | 40 (4.0) | 10 (1.0) | 0.5 (0.05) | 70 |
| 20 | 49.5 (5) | 35 (3.5) | 15 (1.5) | 0.5 (0.05) | 78 |
| 21 | 39.5 (4) | 60 (6) | — | 0.5 (0.05) | 45 |
| 22 | 39.5 (4) | 54 (5.4) | 6 (0.6) | 0.5 (0.05) | 48 |
| 23 | 39.5 (4) | 48 (4.8) | 12 (1.2) | 0.5 (0.05) | 56 |
| 24 | 39.5 (4) | 42 (4.2) | 18 (1.8) | 0.5 (0.05) | 66 |

Table 4 displays formulations for compositions of RDX51027, PTEA, and PBrBA.

TABLE 4

| | Components in Weight percent (grams) | | | | |
|---|---|---|---|---|---|
| Example | RDX51027 | PTEA | PBrBA | PTEA:PBrBA | Irgacure |
| 25 | 69.5 (10.46) | 27 | 3 | 90:10 (4.48) | 0.5 (0.08) |
| 26 | 59.5 (10.15) | 36 | 4 | 90:10 (6.77) | 0.5 (0.085) |
| 27 | 49.5 (9.54) | 45 | 5 | 90:10 (9.54) | 0.5 (0.095) |
| 28 | 39.5 (11.33) | 54 | 6 | 90:10 (17.00) | 0.5 (0.14) |
| 29 | 69.5 (10.96) | 24 | 6 | 80:20 (4.70) | 0.5 (0.078) |
| 30 | 59.5 (9.58) | 32 | 8 | 80:20 (6.39) | 0.5 (0.080) |
| 31 | 49.5 (10.43) | 40 | 10 | 80:20 (10.43) | 0.5 (0.104) |
| 32 | 39.5 (9.13) | 48 | 12 | 80:20 (13.70) | 0.5 (0.114) |

Table 5 displays data from curing films produced from curing films of the compositions in Table 4. The results illustrate that increasing PBrBA concentration in the compositions illustrate that increases refractive index (RI) and Tg of the curable composition and cured free films, respectively.

TABLE 5

| Properties | Examples | | | | | | | |
|---|---|---|---|---|---|---|---|---|
| | 25 | 26 | 27 | 28 | 29 | 30 | 31 | 32 |
| RI Measured (liquid) | 1.594 | 1.589 | 1.582 | 1.581 | 1.596 | 1.593 | 1.588 | 1.585 |
| % Haze | 0.17 | 0.44 | 1.27 | 1.23 | 1.23 | 1.27 | 1.25 | 1.28 |
| OST % Haze | 81.1 | 77.0 | 68.0 | 65.7 | 77.8 | 76.7 | 77.9 | 38.4 |
| Adhesion | 0B | 5B | 5B | 5B | 0B | 0B | 1B | 5B |
| Viscosity (cP) | NA | 2,130 | 580 | 135 | NA | 3,570 | 873 | 250 |
| Tg (° C.) | 98 | 74 | 48 | 38 | 101 | 80 | 30 | 52 |
| L* | 95.7 | 95.9 | 95.8 | 95.8 | 95.7 | 95.8 | 95.8 | 95.8 |
| a* | −0.1 | 0.0 | 0.0 | 0.0 | −0.2 | 0.0 | 0.0 | 0.0 |
| b* | 0.5 | 0.3 | 0.3 | 0.3 | 0.8 | 0.4 | 0.3 | 0.3 |
| YI | 0.8 | 0.5 | 0.4 | 0.4 | 1.2 | 0.6 | 0.5 | 0.4 |

Table 6 displays formulations based on compositions derived from RDX51 PTEA, and PBrBA.

TABLE 6

| | Components in Weight percent (grams) | | | |
|---|---|---|---|---|
| Example | RDX51027 | PTEA | PBrBA | Irgacure |
| 33 | 29.5 (5.9) | 56 (11.2) | 14 (2.8) | 0.5 (0.1) |
| 34 | 29.5 (5.9) | 70 (14) | — | 0.5 (0.1) |
| 35 | 49.5 (9.9) | 50 (10.0) | — | 0.5 (0.1) |
| 36 | 49.5 (9.9) | 45 (9.0) | 5 (1.0) | 0.5 (0.1) |
| 37 | 49.5 (9.9) | 40 (8.0) | 10 (2.0) | 0.5 (0.1) |
| 38 | 69.5 (13.9) | 30 (6.0) | — | 0.5 (0.1) |
| 39 | 69.5 (13.9) | 27 (5.4) | 3 (0.6) | 0.5 (0.1) |
| 40 | 69.5 (13.9) | 24 (4.8) | 6 (1.2) | 0.5 (0.1) |

Table 7 displays data on free films, coated cured flat films as well as coate cured microstructured films produced from the compositions in Table 6. T results of Examples 33 and 34 illustrate that the presence of PBrBA in the compositions provides an unexpected increase in brightness in the resulti microstructured films. Furthermore, the addition of only small amounts of PBrBA to formulations containing about 70 percent of the RDX compound resulted in free films having substantially increased Tg (Examples 38–40).

Table 8 provides the formulations for compositions comprising RDX51027, PEA, and PBrBA.

TABLE 8

| | Components in Weight percent (grams) | | | |
|---|---|---|---|---|
| Example | RDX51027 | PEA | PBrBA | Irgacure |
| 41 | 29.5 (5.9) | 56 (11.2) | 14 (2.8) | 0.5 (0.1) |
| 42 | 29.5 (5.9) | 70 (14) | — | 0.5 (0.1) |
| 43 | 49.5 (9.9) | 50 (10.0) | — | 0.5 (0.1) |
| 44 | 49.5 (9.9) | 47.5 (9.5) | 2.5 (0.5) | 0.5 (0.1) |
| 45 | 49.5 (9.9) | 42.5 (8.5) | 7.5 (1.5) | 0.5 (0.1) |
| 46 | 49.5 (9.9) | 40 (8.0) | 10 (2.0) | 0.5 (0.1) |
| 47 | 69.5 (13.9) | 30 (6.0) | — | 0.5 (0.1) |
| 48 | 69.5 (13.9) | 27 (5.4) | 3 (0.6) | 0.5 (0.1) |
| 49 | 69.5 (13.9) | 24 (4.8) | 6 (1.2) | 0.5 (0.1) |

Table 9 displays data on free films, coated cured flat films, and coated cured microstructured films produced from curing the compositions in Table 8. As with the PTEA formulations of Table 6 and 7, the results in Examples 41 and 42 illustrate that the presence of PBrBA in the PEA containing compositions provides an unexpected increase in brightness in the resulting microstructured films. Also, the addition of minor amounts of PBrBA to the formulations containing about 70% of the RDX compound resulted in cured free films having significantly increased Tg (Examples 47–49).

TABLE 7

| Properties | Examples | | | | | | | |
|---|---|---|---|---|---|---|---|---|
| | 33 | 34 | 35 | 36 | 37 | 38 | 39 | 40 |
| RI Measured (liquid) | 1.579 | 1.569 | 1.5777 | 1.5818 | 1.5861 | 1.5878 | 1.5910 | 1.5942 |
| % Haze | 0.59 | 0.55 | 0.61 | 0.65 | 0.67 | 0.64 | 0.60 | 0.64 |
| Adhesion | 5B | 5B | 5B | 5B | 5B | 5B | 5B | 5B |
| Viscosity (cP) | 56 | 29 | 216 | 334 | 533 | 5,743 | 10,629 | 20,481 |
| Tg (° C.) | 33 | 28 | 49 | 54 | 66 | 88 | 95 | 106 |
| L* | 95.8 | 95.9 | 95.9 | 95.9 | 95.8 | 95.9 | 95.9 | 95.9 |
| a* | 0.0 | 0.0 | 0.0 | 0.0 | 0.0 | 0.0 | 0.0 | 0.0 |
| b* | 0.4 | 0.3 | 0.4 | 0.4 | 0.4 | 0.3 | 0.3 | 0.4 |
| YI | 0.6 | 0.6 | 0.6 | 0.6 | 0.6 | 0.5 | 0.6 | 0.6 |
| Transmission (%) | 92.7 | 92.7 | 92.7 | 92.8 | 92.8 | 92.9 | 92.7 | 92.7 |
| Brightness (cd/m²) | 1491 | 1431 | — | — | — | — | — | — |
| Brightness (%) | | | | | — | — | — | — |

TABLE 9

| Properties | Examples | | | | | | | | |
|---|---|---|---|---|---|---|---|---|---|
| | 41 | 42 | 43 | 44 | 45 | 46 | 47 | 48 | 49 |
| RI Measured (liquid) | 1.552 | 1.538 | 1.5530 | 1.5563 | 1.5617 | 1.5650 | 1.5719 | 1.5764 | 1.5803 |
| % Haze | 0.59 | 0.47 | 0.63 | 0.66 | 0.65 | 0.62 | .60 | .60 | .68 |
| Adhesion | 5B | 5B | 5B | 5B | 5B | 5B | 5B | 5B | 5B |
| Viscosity (cP) | 96 | 49 | 362 | 451 | 743 | 1015 | 11,179 | 19,316 | 34,459 |
| Tg (° C.) | 48 | 31 | 58 | 60 | 67 | 69 | 97 | 104 | 113.5 |
| L* | 96.0 | 96.1 | 96.0 | 96.0 | 96 | 96.0 | 96.0 | 95.9 | 95.9 |
| a* | 0.0 | 0.0 | 0.0 | 0.0 | 0.0 | 0.0 | 0.0 | 0.0 | 0.0 |
| b* | 0.3 | 0.3 | 0.3 | 0.3 | 0.3 | 0.3 | 0.3 | 0.3 | 0.3 |
| YI | 0.5 | 0.5 | 0.5 | 0.5 | 0.5 | 0.5 | 0.5 | 0.5 | 0.5 |
| Transmission (%) | 92.9 | 93.2 | 93.1 | 93.1 | 93.0 | 93.0 | 92.9 | 92.9 | 92.6 |
| Brightness (cd/m²) | 1470 | 1387 | — | — | | | | | |
| Brightness (%) | | | | | — | — | — | — | — |

Comparing similar samples of PTEA, RDX51027 and PBrBA (Example 33) with PEA, RDX51027 and PBrBA (Example 41) it is discovered that the formulation containing the PTEA has better RI that its PEA counterpart. Example 33 also provides a curable composition having a lower viscosity than Example 41, thereby providing better processability than a more viscous composition. Finally, Example 33 provides a cured microstructured film having improved brightness when compared to its PEA counterpart.

Table 10 provides the formulations of compositions comprising a combination of phenylthioethyl acrylate and phenoxyethyl acrylate in addition to the RDX51027 and the pentabromobenzyl acrylate.

TABLE 10

| | Components in Weight percent (grams) | | | | |
|---|---|---|---|---|---|
| Example | RDX51027 | PEA | PTEA | PBrBA | Irgacure |
| 50 | 29.5 (5.9) | 35 (7.0) | 35 (7.0) | — | 0.50 (0.1) |
| 51 | 29.5 (5.9) | 31.5 (6.3) | 31.5 (6.3) | 7 (1.4) | 0.50 (0.1) |
| 52 | 29.5 (5.9) | 28 (5.6) | 28 (5.6) | 14 (2.8) | 0.50 (0.1) |

Table 11 provides the data of the cured free films and coated cured flat films based on the formulations found in Table 10. As shown in Table 11, the addition of PBrBA increases Tg of cured free films and RI of the curable composition.

TABLE 11

| Properties | Examples | | |
|---|---|---|---|
| | 50 | 51 | 52 |
| RI Measured (liquid) | 1.5525 | 1.5590 | 1.5662 |
| % Haze | 0.56 | 0.53 | 0.63 |
| Adhesion | 5B | 5B | 5B |
| Viscosity (cP) | 37 | 51 | 76 |
| Tg (° C.) | 25 | 31 | 37 |
| L | 96.0 | 95.9 | 95.9 |
| a | 0.0 | 0.0 | 0.0 |
| b | 0.3 | 0.3 | 0.3 |
| YI | 0.5 | 0.5 | 0.5 |
| Transmission (%) | 93.0 | 92.8 | 92.7 |

Since PBrBA is a powder and RDX51027 is a solid, the maximum amoun PBrBA that can be added to a blend of RDX51027 and substituted or unsubstituted arylether (meth) acrylate monomer is dependent on the solu of PBrBA in the substituted or unsubstituted arylether (meth)acrylate mono-
mer. The maximum solubility of PBrBA in PEA or PTEA was determ as follows. Solutions of PBrBA in PTEA, PEA, or 50/50 wt./wt. PTEA/PEA were prepared at different concentrations by heating the materials to prom solubility. The homogenous solutions were then allowed to sit overnight a room temperature and the appearance of crystallization was observed vis The data obtained is shown in Table 12. The results show that PTEA offe higher solubility of PBrBA than PEA.

TABLE 12

| Wt. % PBrBA | Reactive Diluent | Crystallization overnight |
|---|---|---|
| 10 | PEA | No |
| 20 | PEA | No |
| 30 | PEA | Yes |
| 10 | PTEA | No |
| 20 | PTEA | No |
| 30 | PTEA | No |
| 10 | 50/50 PTEA/PEA | No |
| 20 | 50/50 PTEA/PEA | No |
| 30 | 50/50 PTEA/PEA | Yes |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is the intended that the invention not be limited to the particular embodiment disclosed as the best mode contemplated for carrying out this invention, but that the invention will include all embodiments falling within the scope of the appended claims.

We claim:

1. A curable composition, comprising:
a multifunctional (meth)acrylate according to the formula

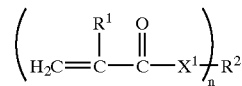

wherein $R^1$ is hydrogen or methyl; $X^1$ is O or S; $R^2$ is $C_1$–$C_6$ alkylene disubstituted bisphenol-A or bisphenol-F, $C_1$–$C_6$ hydroxyalkylene disubstituted bisphenol-A or bisphenol-F, or their brominated forms; and n is 2, 3, or 4;

a substituted or unsubstituted arylether (meth)acrylate monomer;

a brominated aromatic (meth)acrylate monomer according to the formula

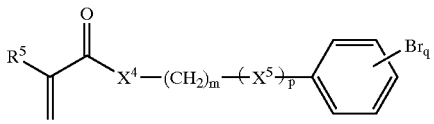

wherein $R^5$ is hydrogen or methyl; $X^4$ is O or S; $X^5$ is O or S; m is 1, 2, or 3; p is or 0 or 1; and q is 4 or 5; and a polymerization initiator.

2. The composition of claim 1, wherein the multifunctional (meth)acrylate is the reaction product of (meth)acrylic acid with a di-epoxide comprising bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-dibromo-4-oxiranylmethoxy-phenoxyl)-1-methyl-ethyl]-phenoxy}-propan-2-ol; or a combination comprising at least one of the foregoing di-epoxides.

3. The composition of claim 1, wherein the multifunctional (meth)acrylate comprises about 25 to about 75 weight percent based on the total weight of the composition.

4. The composition of claim 1, wherein the substituted or unsubstituted arylether (meth)acrylate monomer comprises

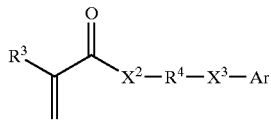

wherein $R^3$ is hydrogen or methyl; $X^2$ is O or S; $X^3$ is O or S; $R_4$ is substituted or unsubstituted $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents.

5. The composition of claim 4, wherein the substituted or unsubstituted arylether (meth)acrylate monomer is phenoxyethyl (meth)acrylate, phenylthioethyl (meth)acrylate, or a combination comprising at least one of the foregoing substituted or unsubstituted arylether (meth)acrylate monomers.

6. The composition of claim 4, wherein the substituted or unsubstituted arylether (meth)acrylate monomer comprises about 15 to about 70 weight percent based on the total weight of the composition.

7. The composition of claim 4, further comprising an additional substituted or unsubstituted arylether (meth)acrylate monomer.

8. The composition of claim 1, wherein the brominated aromatic (meth)acrylate monomer is pentabromobenzyl (meth)acrylate, pentabromophenyl (meth)acrylate or a combination comprising at least one of the foregoing brominated aromatic (meth)acrylate monomers.

9. The composition of claim 1, wherein the brominated aromatic (meth)acrylate monomer comprises about 1 to about 20 weight percent based on the total weight of the composition.

10. The composition of claim 1, wherein the polymerization initiator is a phosphine oxide photoinitiator.

11. The composition of claim 1, wherein the multifunctional (meth)acrylate is the reaction product of (meth)acrylic acid with a di-epoxide comprising bisphenol-A diglycidyl ether, bisphenol-F diglycidyl ether, tetrabromo bisphenol-A diglycidyl ether, tetrabromo bisphenol-F diglycidyl ether, 1,3-bis-{4-[1-methyl-1-(4oxiranylmethoxy-phenyl)-ethyl]-phenoxy}-propan-2-ol, 1,3-bis-{2,6-dibromo-4-[1-(3,5-dibromo-4-oxiranylmethoxy-phenyl)-1-methyl-ethyl]-phenoxy}-propan-2-ol, or a combination comprising at least one of the foregoing di-epoxides;

wherein the substituted or unsubstituted arylether (meth)acrylate monomer is phenylthioethyl (meth)acrylate, phenoxyethyl (meth)acrylate, or a combination comprising at least one of the foregoing substituted or unsubstituted arylether (meth)acrylate monomers;

wherein the brominated aromatic (meth)acrylate monomer is pentabromobenzyl (meth)acrylate; and wherein the polymerization initiator is a phosphine oxide photoinitiator.

12. The composition of claim 1, comprising about 45 to about 65 weight percent of the multifunctional (meth)acrylate;

about 30 to about 45 weight percent of the substituted or unsubstituted arylether (meth)acrylate monomer;

about 1 to about 10 weight percent of the brominated aromatic (meth)acrylate monomer; and about 0.1 to about 5 weight percent of the phosphine oxide photoinitiator based on the total weight of the composition.

13. The composition of claim 12, cured by ultraviolet radiation.

14. An article formed from the cured composition of claim 13.

15. An optical film for backlit displays formed from the cured composition of claim 13.

16. A composition comprising, a multifunctional (meth) acrylate comprising the reaction product of (meth)acrylic acid with a di-epoxide comprising bisphenol-A diglycidyl ether, bisphenol-F diglycidyl ether, tetrabromo bisphenol-A diglycidyl ether, tetrabromo bisphenol-F diglycidyl ether, 1,3-bis-{4-[1-methyl-1-(4-oxiranylmethoxy-phenyl)-ethyl]-phenoxy}-propan-2-ol, 1,3-bis-{2,6-dibromo-4-[1-(3,5-dibromo-4-oxiranylmethoxy-phenyl)-1-methyl-ethyl]-phenoxy}-propan-2-ol, or a combination comprising at least one of the foregoing di-epoxides;

phenylthioethyl (meth)acrylate;

pentabromobenzyl (meth)acrylate; and a phosphine oxide photoinitiator.

17. A method of making a curable composition, comprising:

blending a multifunctional (meth)acrylate according to the formula

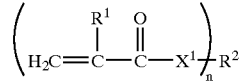

wherein $R^1$ is hydrogen or methyl; $X^1$ is O or S; $R^2$ is $C_1$–$C_6$ alkylene disubstituted bisphenol-A or b bisphenol-F, $C_1$–$C_6$ hydroxyalkylene disubstituted bisphenol-A or bisphenol-F, or their brominated forms; and n is 2, 3, or 4, a substituted or unsubstituted arylether (meth)acrylate monomer, a brominated aromatic (meth)acrylate monomer according to the formula

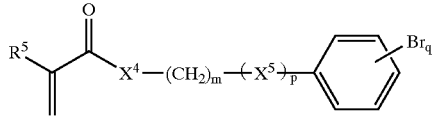

wherein $R^5$ is hydrogen or methyl; $X^4$ is O or S; $X^5$ is O or S; m is 1, 2, or 3; p is 0 or 1; and q is 4 or 5, and a polymerization initiator.

18. A curable composition, consisting of:

a multifunctional (meth)acrylate according to the formula

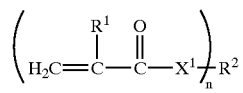

wherein $R^1$ is H or methyl; $X^1$ is O or S; $R^2$ is $C_1$–$C_6$ alkylene disubstituted bisphenol-A or bisphenol-F, $C_1$–$C_6$ hydroxyalkylene disubstituted-bisphenol-A or bisphenol-F, or their brominated forms; and n is 2, 3, or 4;

a substituted or unsubstituted arylether (meth)acrylate monomer according to the formula

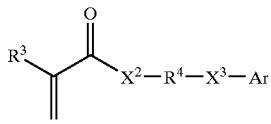

wherein $R^3$ is hydrogen or methyl; $X^2$ is O or S; $X^3$ is S; $R^4$ is substituted or unsubstituted $C_1$–$C_6$ alkyl or alkenyl; Ar is substituted or unsubstituted $C_6$–$C_{12}$ aryl including phenyl; wherein the substitution on the $R^4$ and Ar is, independently, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide,or a combination comprising at least one of the forgoing substituents; and a polymerization initiator.

* * * * *

UNITED STATES PATENT AND TRADEMARK OFFICE
CERTIFICATE OF CORRECTION

PATENT NO.    : 6,833,391 B1
DATED         : December 21, 2004
INVENTOR(S)   : Chisholm et al.

It is certified that error appears in the above-identified patent and that said Letters Patent is hereby corrected as shown below:

Title page,
Item [57], ABSTRACT,
Line 6, before "provide" delete "compositons" and insert therefor -- compositions --

Column 2,
Line 20, after "unsubstituted" delete "C-C" and insert therefor -- $C_1$-$C_{300}$ --
Line 40, delete "$CH_2$,-C(0)-" and insert therefor -- -$CH_2$-,-C(0)-, --
Line 47, before "tetrabromo" delete "ether;"
Line 59, after "phenyl]-" delete "I" and insert therefor -- 1 --

Column 3,
Line 26, after "$R^4$ is" delete ","
Line 57, after "wherein" delete "Xis" and insert therefor -- $X^3$ is --

Column 5,
Line 21, after "methyl;" delete "$X_1$" and insert therefor -- $X^1$ --
Line 22, after "aryl;" delete "alkaryl,arylalkyl;" and insert therefor -- alkaryl, arylalkyl; --

Column 9,
Line 49, after "with the" delete "actu" and insert therefor -- actual --

Column 10,
Line 6, after "formulation" delete "end" and insert therefor -- enclosed --
Line 24, In Table 3 column "PEA" delete "25(2.8)" and insert therefor -- 28(2.8) --
Line 62, after "data" delete "from curing" and insert therefor -- on free films and coated cured flat --

Column 11,
Line 18, after "derived from" delete "RDX51" and insert therefor -- RDX51027 --
Line 38, after "Table 6." Delete "T" and insert therefor -- The --
Line 40, after "in the" delete "resulti" and insert therefor -- resulting --

Column 13,
Line 64, after "maximum" delete "amoun" and insert therefor -- amount --
Line 66, after "on the" delete "solu" and insert therefor -- solubility --

UNITED STATES PATENT AND TRADEMARK OFFICE
CERTIFICATE OF CORRECTION

PATENT NO. : 6,833,391 B1
DATED : December 21, 2004
INVENTOR(S) : Chisholm et al.

It is certified that error appears in the above-identified patent and that said Letters Patent is hereby corrected as shown below:

Column 14,
Line 20, after "was" delete "determ" and insert therefor -- determined --
Line 22, after "materials to" delete "prom" and insert therefor -- promote --
Line 25, after "observed" delete "vis" and insert therefor -- visually --
Line 48, after "from" delete "essential"

Column 15,
Line 23, after "oxiranylmethoxy-" delete "phenoxyl)" and insert therefor -- phenyl) --
Line 40, after "$C_6$-$C_{12}$" delete "aryl,including" and insert therefor -- aryl, including --

Column 16,
Line 64, after "bisphenol-A or" delete "b"

Column 18,
Line 1, after "hydroxyalkylene" delete "disubstituted-bisphenol-A" and insert therefor -- disubstituted bisphenol-A --

Signed and Sealed this

Twelfth Day of April, 2005

JON W. DUDAS
*Director of the United States Patent and Trademark Office*